(12) United States Patent
McKelvey et al.

(10) Patent No.: US 7,143,584 B2
(45) Date of Patent: Dec. 5, 2006

(54) GAS TURBINE APPARATUS

(75) Inventors: Terence McKelvey, Chiba (JP); Eishi Marui, Kanagawa (JP); Masahiro Miyamoto, Kanagawa (JP); Tadashi Kataoka, Chiba (JP); Tai Furuya, Kanagawa (JP)

(73) Assignee: Ebara Corporation, Tokyo (JP)

( * ) Notice: Subject to any disclaimer, the term of this patent is extended or adjusted under 35 U.S.C. 154(b) by 357 days.

(21) Appl. No.: 10/483,090

(22) PCT Filed: Feb. 17, 2003

(86) PCT No.: PCT/JP03/01663

§ 371 (c)(1),
(2), (4) Date: Jul. 7, 2004

(87) PCT Pub. No.: WO03/069144

PCT Pub. Date: Aug. 21, 2003

(65) Prior Publication Data
US 2004/0237537 A1    Dec. 2, 2004

(30) Foreign Application Priority Data
Feb. 15, 2002  (JP)  ............... 2002-038360
Mar. 7, 2002   (JP)  ............... 2002-062269

(51) Int. Cl.
F02C 9/28 (2006.01)
(52) U.S. Cl. ............... 60/778; 60/790; 60/39.281
(58) Field of Classification Search ............. 60/39.281, 60/773, 778, 786, 790
See application file for complete search history.

(56) References Cited

U.S. PATENT DOCUMENTS 3,520,133 A    7/1970   Loft et al.
4,550,565 A *  11/1985  Ozono .................. 60/39.27
5,165,223 A *  11/1992  Ingham et al. ............ 60/778
5,584,171 A *  12/1996  Sato et al. ............... 60/773

FOREIGN PATENT DOCUMENTS

| JP | 7-3189 | 1/1995 |
| JP | 2000-80928 | 3/2000 |
| JP | 2000-205563 | 7/2000 |
| WO | 92/10657 | 6/1992 |

* cited by examiner

Primary Examiner—L. J. Casaregola
(74) Attorney, Agent, or Firm—Oblon, Spivak, McClelland, Maier & Neustadt, P.C.

(57) ABSTRACT

A gas turbine apparatus is provided which comprises a turbine, a combustor for burning a mixture of air and fuel and providing the turbine with a combustion gas to drive it, a generator connected to the turbine to receive rotational force therefrom to generate electric power, a temperature sensor for measuring a temperature of an exhaust gas from the turbine, a temperature setting unit and a power setting unit. The power setting unit sets a set output power of the generator such that a first set output power is set when starting-up the generator, the first set output power is decreased at a first rate when the measured exhaust gas temperature reaches a second set temperature higher than a first target temperature, a currently set output power is decreased at a second rate higher than the first rate when the measured exhaust gas temperature reaches a third set temperature higher than the second set temperature after decreasing the set output power at the first rate, and a currently set output power is increased at a third rate smaller than the second rate when the exhaust gas temperature reaches a forth set temperature smaller than the first set temperature after decreasing the set output power at the second rate.

12 Claims, 5 Drawing Sheets

GAS TURBINE APPARATUS

TECHNICAL FIELD

The present invention relates to a gas turbine apparatus, and more particularly to a gas turbine apparatus in which an output power of a generator can be adequately controlled based on a temperature of an exhaust gas of a gas turbine engine.

BACKGROUND ART

As a result of liberalization of the energy supply market, there has been a significant growth in interest in the provision of local distribution of energy. One means that is particularly suited to the provision of a localized energy source is the gas turbine. Such a turbine generally comprises a generator that generates electric power and a gas turbine engine for driving the generator. The turbine engine comprises a turbine rotatably mounted on a rotation shaft, a combustor for generating a combustion gas, a fuel control valve for controlling an amount of fuel supplied to the combustor, and an air compressor for compressing air supplied to the combustor.

In the gas turbine apparatus described above, fuel an amount of which is controlled by the fuel control valve and air which is compressed by the air compressor, are supplied to the combustor to form therein an air/fuel mixture. This air/fuel mixture is burnt by the combustor to generate a combustion gas for supply to the turbine, to thereby rotate it at high speed. The generator is connected to one end of the rotation shaft and is driven by the turbine through the rotation shaft to generate electric power.

In the gas turbine apparatus as described above, a variety of operation controls such as a start-up control, a constant speed operation control, and the like are performed by controlling an opening degree of the fuel control valve. For example, generation of electric power is controlled such that a detected temperature of an exhaust gas from the turbine is not allowed to exceed a predetermined value. Namely, a rise in output power from the generator is dependent on a rise in a level of combustion in a combustor. As a consequence, a maximum output power of the generator is dependent on a maximum tolerance temperature of an exhaust gas in the gas turbine engine.

FIG. 1 is a graph illustrating a relationship among an exhaust gas temperature EGT, a set power PWs and an actual output power PWa of the generator, according to a prior method for starting-up a generator. When power is required to be supplied from the generator to a load, firstly a gas turbine engine is, in general, started-up in a load-free state; under such a state, a turbine controller of a gas turbine apparatus sets, at time t1, a set output power PWs of the generator at a predetermined value. Then, in response to the set output power PWs, an opening degree of a fuel control valve is gradually increased to thereby increase an amount of fuel that is supplied, thereby causing an actual or process output power PWa from the generator to advance and an exhaust gas temperature (or process temperature) EGT to increase.

A gas turbine engine as described above is subject to an inherent tolerance maximum temperature Tmax of an exhaust gas temperature. A set output power PWs of the exhaust gas is determined so as to prevent a process or actual exhaust gas temperature EGT from the turbine reaching the tolerance maximum temperature Tmax. In a case that the exhaust gas temperature EGT does reach the set temperature Ts at the time t2, as illustrated in FIG. 1, the set power PWs of the generator is decreased at a predetermined rate. However, a case may occur wherein an actual output power PWa of the generator is significantly lower than a set output power PWs at time t2. In such a case, the actual output power PWs is controlled to further increase, with the result that the exhaust gas temperature EGT also further increases, resulting in a so-called "over-shooting" phenomenon, as shown in FIG. 1. When the set output power PWs of the generator is equal to the actual or process output power at time t3 as shown in FIG. 1, the actual output power PWs is controlled to be decreased in correspondence with the decreasing set output power PWs. Therefore, from time t3, the exhaust gas temperature EGT is changed from a positive inclination to a negative inclination, as illustrated in FIG. 1. The exhaust gas temperature EGT gradually decreases, and when it reaches the set temperature Ts at time t4, the set output power PWs of the generator is changed to increase at a predetermined rate. In response thereto, the exhaust gas temperature EGT begins to increase again. In this way, the exhaust gas temperature EGT can be substantially made to converge with the set temperature Ts, whereby the actual output power PWa can be made to substantially converge with the power PWs.

In the prior art control method of a generator described above, the actual or process output power PWa of the generator is dependent on the set temperature Ts of the exhaust gas, and the set temperature Ts is predetermined by including a margin α for a tolerance maximum temperature Tmax in view of any over-shooting phenomenon which occurs at a time of increasing the actual exhaust gas temperature. From this, it will be apparent that in the prior control method a problem arises in that an actual output power PWa is limited to a relatively low value as a consequence of a margin α of the exhaust gas temperature.

In some cases, in addition to the set temperature Ts, upper and lower set temperatures Tsu and Tsl are set, which are respectively higher and lower than the set temperature Ts. The set output power PWs is decreased at a predetermined rate when the exhaust gas temperature EGT becomes higher than a set upper temperature Tsu, while the power PWs is increased at a predetermined rate when the temperature EGT falls beneath that of the set lower temperature Tsl. From this description, it will be apparent that an exhaust gas temperature EGT reaches a set upper set temperature Tsu at a time t2 in FIG. 1, thereby setting an output power PWs at a level lower than that of a predetermined rate, to thereby reduce a temperature EGT. In this context, it should also be pointed that a temperature EGT reaches a set lower temperature Tsl at time t4, as shown in FIG. 1. As a result, the power PWs is increased at a predetermined rate to increase the temperature EGT. In this case, the exhaust gas temperature EGT can be substantially converged with the set temperature Ts, and thereby the actual output power PWa can be substantially converged with the power PWs.

However, in the prior second control method using the upper and lower set temperatures, there exists a problem which may arise as a result of increasing and decreasing rates in the set output power PWs. That is, if the changing rates are set to be relatively large, hunting phenomenon may occur at an actual output power PWa, resulting in destabilization of operation of an engine control system. On the other hand, if the rates are set to be relatively low, it may take a long time to convert the exhaust gas temperature EGT to the set temperature Ts, and "over-shooting" phenomenon may therefore readily occur.

FIG. 2 is a graph illustrating a relationship between an exhaust gas temperature EGT and a set output power PWs of a generator, in a case where increasing and decreasing rates of the set output power PWs are relatively large. As is illustrated in FIG. 2, when the exhaust gas temperature EGT reaches an upper set temperature Tsu, the set output power PWs is lowered rapidly and hence the temperature EGT can be decreased rapidly. Therefore, a problem of substantial over-shooting wherein the exhaust gas temperature EGT becomes much higher than the upper set temperature Tsu, is suppressed. However, rapid variation in the set output power PWs produces hunting at an actual output power, which in turn produces hunting on the exhaust gas temperature EGT as shown in FIG. 2. As a result, operation of the control system is destabilized.

Alternatively, an increase and decrease of the set output power PWs may occur even after the exhaust gas temperature EGT reaches the upper and lower set temperatures Tsu and Tsl, respectively. The exhaust gas temperature EGT still increases gradually by thermal inertia when the temperature EGT exceeds the upper set temperature Tsu, because the decreasing rate of the set output power PWs is small. Then, after over-shooting, the temperature EGT decreases. However, the decreasing rate of the temperature EGT is slow due to the slow rate of decrease in the set output power PWs. When the temperature EGT reaches the lower set temperature Tsl, the set output power PWs of the generator is increased again at a predetermined rate. Since the rate of increase is small, the temperature EGT continues to decrease under thermal inertia, and after over-shooting occurs it once again increases. As described above, under the condition that the increasing and decreasing rates of the set output power PWs are small, over-shooting may occur. In addition, a long period of time may be required to converge the temperature EGT and an actual output power.

DISCLOSURE OF THE INVENTION

It is therefore an object of the present invention to reduce "over-shooting" phenomenon of an exhaust gas temperature to thereby provide stable operation of a gas turbine apparatus.

It is another object of the present invention to raise an actual output power of a generator in a gas turbine apparatus.

To achieve the above objects, a gas turbine apparatus according to a first aspect of the present invention comprises:

a turbine for providing rotational force;

a combustor for burning a mixture of air and fuel and providing said turbine with a combustion gas to drive it;

a generator connected to said turbine to receive the rotational force to generate electric power;

a temperature sensor for measuring a temperature of an exhaust gas from said turbine;

temperature setting means for setting a target temperature of said exhaust gas as a first set temperature, a second set temperature higher than said first set temperature, a third set temperature higher than said second temperature, and a fourth set temperature smaller than said first set temperature; and power setting-means connected to said temperature sensor and temperature setting means, for setting a set output power of said generator as follows:

a first set output power is set when starting-up said generator;

said first set output power of said generator is decreased at a first rate when said exhaust gas temperature measured by said temperature sensor reaches said second set temperature;

a currently set output power of said generator is decreased at a second rate higher than said first rate when said exhaust gas temperature reaches said third set temperature after decreasing said set output power at said first rate; and a currently set output power of said generator is increased at a third rate smaller than said second rate when said exhaust gas temperature reaches said forth set temperature after decreasing said set output power at said second rate.

In the gas turbine apparatus as above, it is preferable to set a difference between the first and second set temperatures to be substantially equal to a difference between the first and fourth set temperatures. Further, it is preferable to set the first rate for use to decrease the set output power of the generator to be substantially equal to the third rate for use to increase the set output power of the generator.

Further more, it is preferable the temperature setting means further comprises, set temperature increasing means for linearly increasing the exhaust gas set temperature from the first set temperature to a fifth set temperature near a tolerance maximum set temperature during a predetermined time period after the exhaust gas temperature measured by the temperature sensor converges on the first set temperature, and then keeping the set temperature at the fifth set temperature. In such a case, it is preferable that the set temperature increasing means is adapted to set predetermined bands above and below a function defining the linear increase of the exhaust gas set temperature from the first set temperature to the fifth set temperature, and the power setting means is adapted to decrease a currently set output power at a predetermined rate when the exhaust gas temperature is higher than the upper band, and to increase a currently set output power at a predetermined rate when said exhaust gas temperature is lower than the lower band.

A gas turbine apparatus according to a second aspect of the present invention which comprises:

a turbine for providing rotational force;

a combustor for burning a mixture of air and fuel and providing said turbine with a combustion gas to drive it;

a generator connected to said turbine to receive the rotational force to generate electric power;

a temperature sensor for measuring a temperature of an exhaust gas from said turbine;

temperature setting means for setting a target temperature of said exhaust gas as a first set temperature; and power setting means connected to said temperature sensor and temperature setting means, for setting a set output power of said generator such that a first set output power is set when starting-up said generator, and said first set output power of said generator is changed to a current process output power of said generator when said exhaust gas temperature measured by said temperature sensor reaches said first set temperature.

In this gas turbine apparatus, it is preferable that the temperature setting means further comprises, set temperature increasing means for linearly increasing the exhaust gas set temperature from the first set temperature to a second set temperature near a tolerance maximum set temperature during a predetermined time period after the exhaust gas temperature measured by the temperature sensor converges on the first set temperature, and then keeping the set temperature at the second set temperature. In such a case, it is preferable that the set temperature increasing means is adapted to set predetermined bands above and below a function defining the linear increase of the exhaust gas set temperature from the first set temperature to the second set temperature, and the power setting means is adapted to decrease a currently set output power at a predetermined rate when the exhaust gas temperature is higher than the upper band, and to increase a currently set output power at a predetermined rate when said exhaust gas temperature is lower than the lower band.

The present invention also provide a method for starting-up a gas turbine apparatus which comprises a turbine for providing rotational force, a combustor for burning a mixture of air and fuel and providing said turbine with a combustion gas to drive it, and a generator connected to said turbine to receive the rotational force to generate electric power; said method comprising the steps of:

setting a set output power of said generator such that a first set output power is set when starting-up said generator;

setting a target temperature of said exhaust gas as a first set temperature, a second set temperature higher than said first set temperature, a third set temperature higher than said second temperature, and a fourth set temperature smaller than said first set temperature;

decreasing said first set output power of said generator at a first rate when said exhaust gas temperature measured by a temperature sensor reaches said second set temperature;

decreasing a current set output power of said generator at a second rate higher than said first rate when said exhaust gas temperature reaches said third set temperature after decreasing said set output power at said first rate; and increasing a current set output power of said generator at a third rate smaller than said first rate when said exhaust gas temperature reaches said forth set temperature after decreasing said set output power at said second rate.

The present invention also provides another method for staring-up a gas turbine apparatus which comprises a turbine for providing rotational force, a combustor for burning a mixture of air and fuel and providing said turbine with a combustion gas to drive it, and a generator connected to said turbine to receive the rotational force to generate electric power, said method comprising the steps of;

setting a set output power of said generator such that a first set output power is set when starting-up said generator;

setting a target temperature of said exhaust gas as a first set temperature; and changing said first set output power of said generator to a current process output power when said exhaust gas temperature measured by said temperature sensor reaches said first set temperature.

BRIEF DESCRIPTION OF THE DRAWINGS

The advantage and principles of the present invention will be obvious to those skilled in the art of gas turbine apparatuses from the following description of best modes for carrying out the invention with reference to the accompanying drawings. In the drawings.

BEST MODE FOR CARRYING OUT THE INVENTION

Figure 3A:
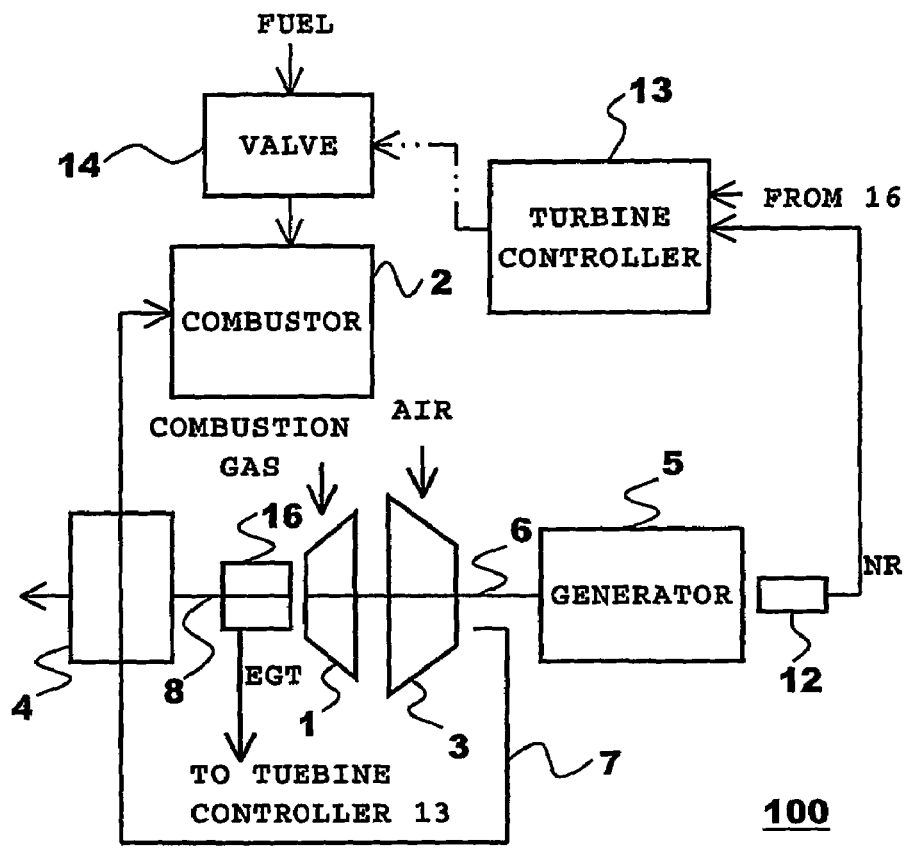
FIG. 3A is a block diagram illustrating an embodiment of a gas turbine apparatus according to the present invention.
Figure 3B:
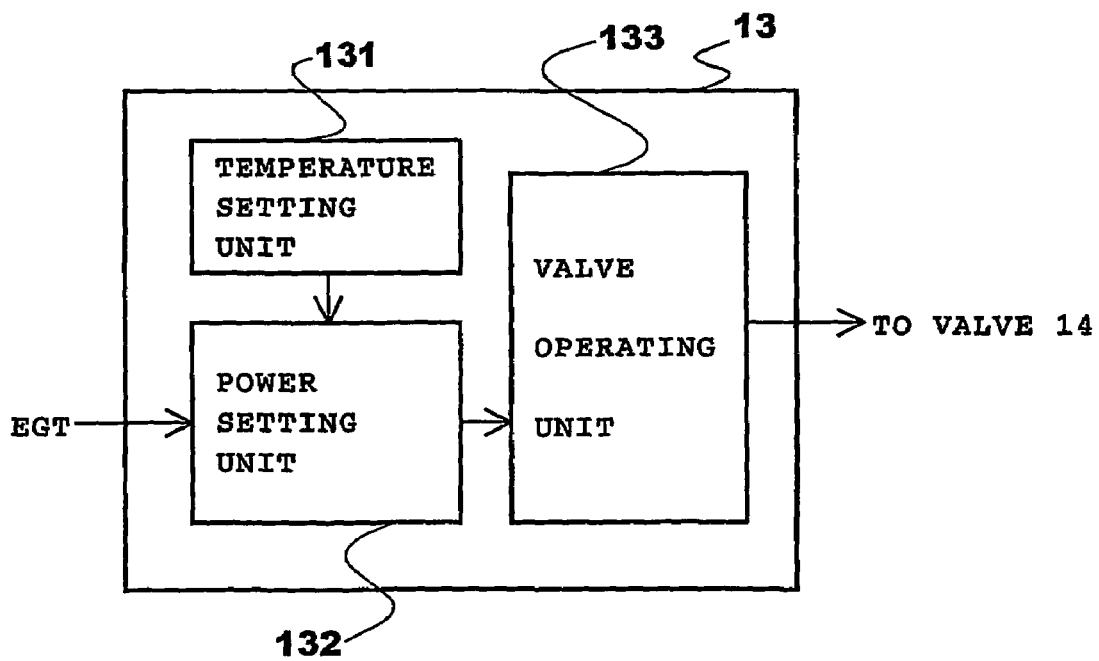
FIG. 3B is a block diagram explaining a constitution of a turbine controller in the gas turbine apparatus illustrated in FIG. 3B.

FIG. 3 is a semantic block diagram illustrating a gas turbine apparatus according to a preferred embodiment of the present invention, and FIG. 3B is a block diagram illustrating a constitution of a turbine controller 13 incorporated in the gas turbine apparatus shown in FIG. 3A. As illustrated in FIG. 3A, the gas turbine apparatus 100 according to the present invention comprises a turbine 1; a combustor 2 for burning an air/fuel mixture consisting of a fuel and air for generating a combustion gas; a fuel control valve 14 for controlling an amount of fuel supplied to the combustor 2; and an air compressor 3 for supplying compressed air to the combustor 2. The gas turbine apparatus 100 also comprises a heat exchanger 4 for heating air used for combustion by the heat of the combustion exhaust gas; and the turbine controller 13 for controlling the turbine 1.

The gas turbine apparatus 100 is any one of micro gas turbine apparatuses and typical gas turbine apparatuses.

The turbine 1 has a plurality of rotor blades (not shown) which receive a fluid for rotation, and is rotatably supported on a rotation shaft 6 within a casing (not shown). The air compressor 3 is adapted to be driven by the turbine 1 through the rotation shaft 6 in order to compress air. The air compressor 3 is connected to the combustor 2 through a pipe 7, such that air compressed by the air compressor 3 is supplied to the combustor 2 through the pipe 7. The heat exchanger 3 is installed midway along the pipe 7, so that the air compressed by the air compressor 3 is heated by the heat exchanger 4 before it is supplied to the combustor 2.

The fuel control valve 14 is disposed at an upstream side of the combustor 2. A fuel supplied from a fuel supply source (not shown) passes through the fuel control valve 14 before it is supplied to the combustor 2. An opening degree of the fuel control valve 14 is variable, so that the amount of fuel supplied to the combustor 2 can be adjusted by manipulating the opening degree.

The fuel and the air (through the pipe 7) supplied to the combustor 2 form an air/fuel mixture within the combustor 2, and the air/fuel mixture is burnt within the combustor 2 to generate a high-temperature and high-pressure combustion gas. Then, this combustion gas is supplied to the turbine 1 to rotate it at high speed.

A generator 5 is connected to the end of the rotation shaft 6, and is rotated through the rotation shaft 6 by driving of the turbine to generate electric power. The combustion gas supplied to the turbine 1 is exhausted after it is sent to the heat exchanger 4 through a pipe 8. The alternating electric power generated by the generator 5 is adjusted for use in commercial alternating electric power by an AC/DC converter, a booster, an inverter, etc., not shown, and thereafter is output. Actual output power is controllable to any value set by the inverter. Therefore, when an output power of the generator is set by the turbine controller 13, the generator 5 can supply a load with any level of output power within a level of energy output from the turbine 1.

The gas turbine apparatus 100 comprises a variety of sensors. The turbine controller 13 controls the opening degree of the fuel control valve 14, the set output power of the generator and so on, based on values measured by the sensors. The sensors include a rotational speed sensor 12 which measures a current rotational speed (or the number of rotations per unit time period) NR of the rotation shaft 6. In a constant-speed drive mode, the opening degree of the fuel control valve 14 is feedback-controlled so as to maintain the rotational speed constant. A temperature sensor (EGT sensor) 16 for measuring a temperature EGT of an exhaust gas from the turbine 1, is provided at a combustion gas exhauster thereof. The output power of the generator is controlled so that the exhaust gas temperature never exceeds a tolerance maximum temperature.

As shown in FIG. 3B, the turbine controller 13 of the gas turbine apparatus 100 shown in FIG. 3A, comprises a temperature setting unit 131 for setting a temperature Ts of the combustion exhaust gas from the turbine 1, a power setting unit 132 for setting an output power PWs of the generator 5 in response to the set temperature Ts and a measured current temperature EGT from the temperature sensor 16, and a valve operating unit 133 for controlling the opening degree of the fuel control valve 14 in response to the set output power PWs. It is to be noted that FIG. 3B illustrates only the units 131–133 which are necessary to start-up the generator 5 according to the present invention, and does not illustrate other elements or units for other controls in the gas turbine apparatus 100.

A generator control operation by the turbine controller 13 according to the present invention will next be explained with reference to FIGS. 4–8.

Figure 1:
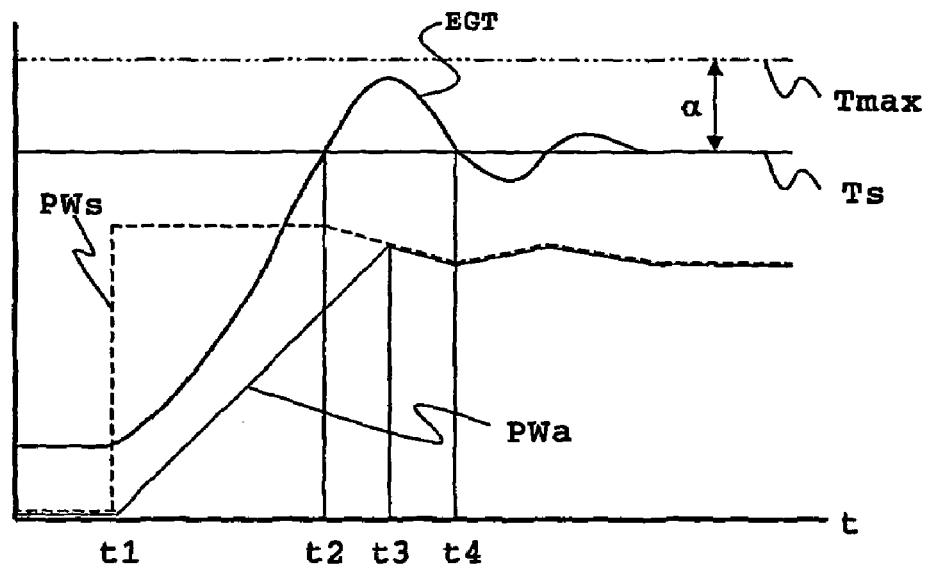
FIG. 1 is a semantic graph showing a relationship between a set output power of a generator and an exhaust gas temperature in a prior gas turbine apparatus.
Figure 2:
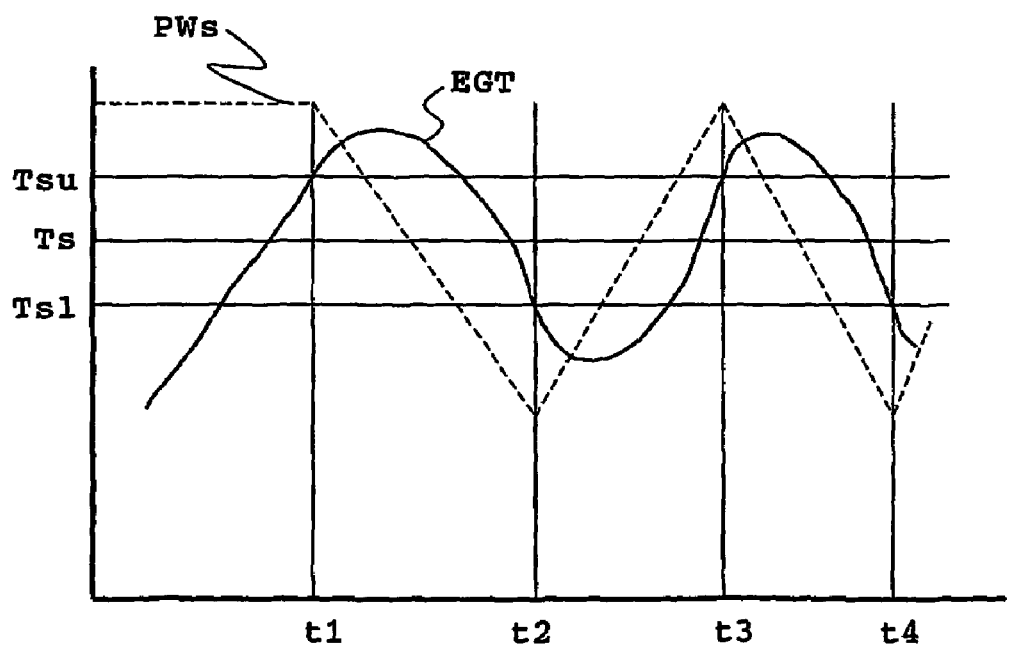
FIG. 2 is a semantic graph showing a relationship between a set output power of a generator and an exhaust gas temperature in a prior gas turbine apparatus in which the set output power is increased and decreased at relatively higher rates.
Figure 4:
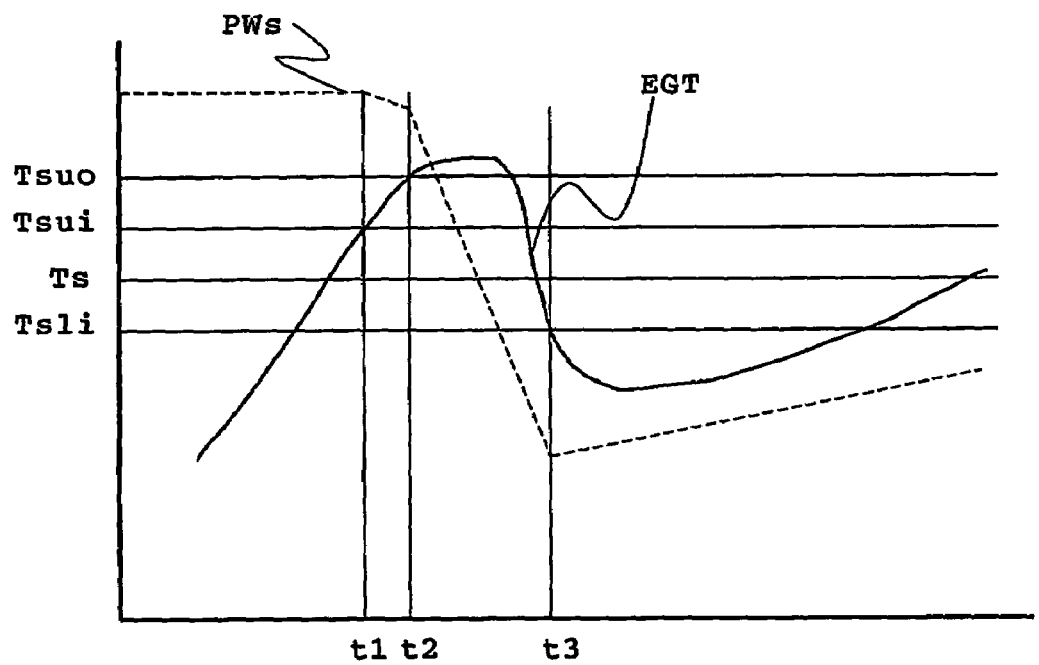
FIG. 4 is a semantic graph illustrating a relationship between a set output power of a generator and an exhaust gas temperature, according to the present invention in a case where a first start-up control process for the generator is executed in the gas turbine apparatus shown in FIGS. 3A and 3B.
Figure 5:
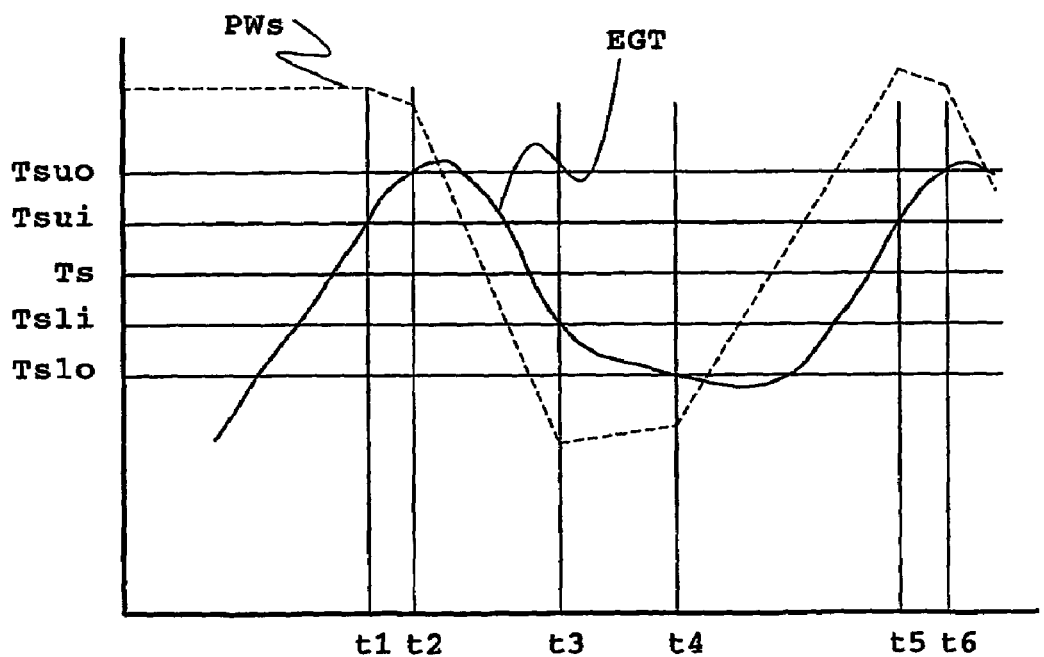
FIG. 5 is a semantic graph illustrating a relationship between a set output power of a generator and an exhaust gas temperature, according to an assumed improvement of a prior art.

FIG. 4 is a semantic graph showing a relationship between a set output power PWs and a measured exhaust gas temperature EGT from the temperature sensor 16, in a case where a first generator start-up control process according to the present invention is performed. FIG. 5 is also a semantic graph showing a relationship between a set output power PWs and a measured exhaust gas temperature EGT, in an assumed process which is an improvement of the prior arts explained above with reference to FIGS. 1 and 2. In each of FIGS. 4 and 5, the set output power PWs of a generator is indicated by a dotted line, while the exhaust gas temperature EGT is indicated by a solid line. Such a generator start-up control process made on the basis of the set output power PWs and the set temperature Ts of the exhaust gas is carried out while increasing an actual output power of the generator from zero to a rated output power, after starting-up the gas turbine apparatus 100 and controlling the rotational speed NR of the turbine 1 at a predetermined level. As described above, since an actual output power PWa of the generator corresponds to a combustion level in the gas turbine engine, the temperature EGT of the exhaust gas increases in response to the advance of the actual output power PWa of the generator.

Before explaining the first generator start-up control process according to the present invention, the control process relating to FIG. 5 will be explained. As mentioned above, this process has been assumed as an improvement of the prior arts explained with reference to FIGS. 1 and 2. As illustrated in FIG. 5, the improved process employs two set upper temperatures which are above a target set temperature Ts and two lower set temperatures which are below the target temperature Ts. Namely, in the process, an outer upper set temperature Tsuo and an inner upper set temperature Tsui (Tsuo>Tsui) are utilized instead of the upper set temperature Tsu shown in FIG. 2, while an outer lower set temperature Tslo and an inner lower set temperature Tsli (Tslo<Tsli) are utilized instead of the lower set temperature Tsl shown in FIG. 2. When the exhaust gas temperature (or measured temperature) EGT exceeds the inner upper set temperature Tsui at time t1, the set output power PWs is controlled to decrease at a lower rate. When the temperature further exceeds the outer upper set temperature Tsuo at time t2, the set output power PWs is controlled to decrease at a higher rate. Similarly, when the temperature EGT falls below the inner lower set temperature Tsli at time t3, the set output power PWs is controlled to increase at a lower rate, and when the temperature EGT further falls below the outer lower set temperature Tslo at time t4, the set output power PWs is controlled to increase at a higher rate.

By setting the two temperature levels (or inner and outer set temperatures) instead of each of the upper and lower set temperatures Tsu and Tsl, it becomes possible to vary the set output power PWs of the generator at both the lower and higher rate. Specially, since the set output power PWs is controlled to decrease rapidly when the temperature EGT exceeds the outer upper set temperature Tsuo, "over-shooting" phenomenon wherein the actual exhaust gas temperature EGT rises excessively above the temperature Tsuo may be suppressed. Moreover, since the set output power PWs is controlled to increase or decrease at the lower rate when the temperature EGT becomes lower or higher than the inner lower or upper set temperature Tsli or Tsui, the generator start-up control operation is made more stable.

However, even if the outer and inner upper set temperatures and outer and inner lower set temperatures are employed at both upper and lower sides of the target set temperature Ts, a problem occurs that the set output power PWs of the generator swings significantly, and hence the temperature EGT also swings significantly, as shown in FIG. 5.

In view of the above problems of the assumed improved process, the inventors of the present invention have further improved the process to thereby accomplish the first generator start-up control process. In the first control process, a predetermined target set temperature Ts of the generator, outer and inner upper set temperatures Tsuo and Tsui which are higher than the set temperature Ts and an inner lower set temperature Tsli which is lower than the set temperature Ts as illustrated in FIG. 4 are provided and stored at the temperature setting unit 131 of the turbine controller 13

(FIG. 3B). An outer lower set temperature Tslo as shown in FIG. 5 is not set or stored in the temperature setting unit 131. The power setting unit 132 monitors and compares the exhaust gas temperature EGT from the temperature sensor 16 with the set temperatures Tsuo, Tsui, and Tsli, and changes the set output power PWs to decrease at a predetermined lower rate when the temperature EGT exceeds the set temperature Tsui at time t1, and then decreases at a predetermined higher rate when the temperature EGT exceeds the set temperature Tsuo at time t2. Thereafter, when the temperature EGT falls to the set temperature Tsli at time t3, the power setting unit 132 changes the set output power PWs to increase at a predetermined lower rate.

It is preferable to set a difference between the set temperatures Tsui and Ts to be substantially equal to that between the set temperatures Tsli and Ts. Further, it is preferable to set them such that the predetermined decreasing rate when the temperature EGT exceeds the set temperature Tsui is substantially equal to the predetermined increasing rate when the temperature EGT falls below the temperature Tsli.

As explained above, in the turbine control unit 13, the four temperatures Tsuo, Tsui, Ts and Tsli are previously set and stored in the temperature setting unit 131, and the set output power PWs are changed as shown in FIG. 4 by the power setting unit 132 in accordance with the temperature EGT from the sensor 16; and the opening degree of the: fuel control valve 14 is adjusted by the valve operating unit 133 in response to the set temperature PWs. In other words, the turbine controller 13 sets the output power PWs of the generator equal to a predetermined value such as a rated value, as shown in FIG. 4, at the time of generator start-up, and thereby the opening degree of the fuel control valve 14 is gradually opened to increase an amount of fuel supplied. By increasing the amount of fuel supplied, an actual (or process) power outputted from the generator increases, for example, from zero towards the rated output power. As the actual output power increases, the exhaust gas temperature EGT increases. When the temperature EGT exceeds the inner upper set temperature Tsui (at time t1), the set output power PWs of the generator is changed to decrease slowly and hence the actual output power thereof is also controlled to decrease slowly. However, the temperature EGT continues to increase due to thermal inertia, and, thereafter, when the temperature EGT reaches the outer upper set temperature Tsuo (at time t2), the set output power PWs of the generator is changed to decrease rapidly. Therefore, "over-shooting" phenomenon of the temperature EGT is suppressed, and the temperature EGT falls rapidly. When the temperature EGT falls to or below the inner lower set temperature Tsli (at time t3), the set output power PWs of the generator is switched to increase slowly.

Since an outer lower set temperature Tslo and hence a rapid increasing rate are not employed in the first control process of the present invention, the exhaust gas temperature EGT can gradually converge in a range between the set temperatures Tsui and Tsli and having a center at the target set temperature Ts. Therefore, a problem such that the actual exhaust gas temperature EGT and the actual output power PWs of the generator swing, is avoided, and thus a stable generator start-up operation can be accomplished.

According to the first generator start-up control process, the exhaust gas temperature EGT can be controlled up to around the outer upper set temperature Tsuo, without any substantial "over-shooting" phenomenon. Therefore, the target temperature or set temperature Ts can be set to be near the tolerance maximum temperature Tmax which is the so-called tripping exhaust gas temperature. The tripping exhaust gas temperature is referred to a set temperature for safety to trip the apparatus so as to stop a supply of energy from the generator when an exhaust gas temperature reaches it. Therefore, in the gas turbine apparatus 100 according to the present invention, the generator can substantially provide a tolerance maximum output power. Moreover, since "over-shooting" phenomenon of the temperature EGT is suppressed, a rate of increase in the output power of the generator can be set to be relatively large. As a result, the gas turbine apparatus 100 is capable of starting-up within a short time period.

Figure 6:
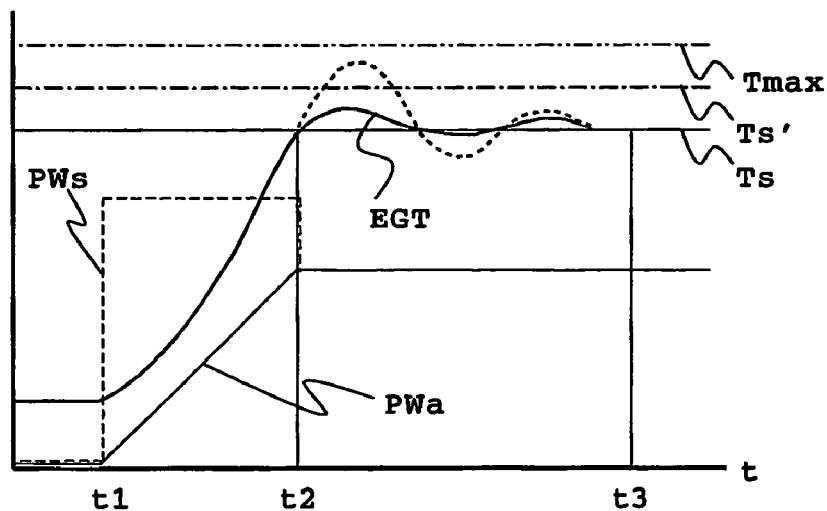
FIG. 6 is a semantic graph showing a relationship among set and actual output powers of the generator and an exhaust gas temperature, according to the present invention in a case where a second start-up control process for the generator is executed in the gas turbine apparatus shown in FIGS. 3A and 3B.

FIG. 6 is a semantic graph for use in explaining a second generator start-up control process according to the present invention, executed in the gas turbine apparatus 100 shown in FIGS. 3A and 3B. In FIG. 6, EGT plots a temperature of a combustion exhaust gas measured by the temperature sensor 16, PWs plots a set output power which is variably set at the power setting unit 132, and PWa plots an actual output power from the generator 5. Ts denotes a target set temperature which is set at the temperature setting unit 131.

In the second start-up control process, a set output power PWs is set at a predetermined value at time t1 in the power setting unit 132. In the gas turbine apparatus 100, an opening degree of the fuel control valve 14 gradually becomes higher under control of the valve operating unit 133, to thereby increase the actual output power PWa toward the set output power PWs. As the actual output power PWa increases, the exhaust gas temperature EGT also increases, and reaches the target set temperature Ts at time t2.

When the temperature EGT exceeds the temperature Ts at time t2, the power setting unit 132 changes the set output power PWs to the actual output power PWa. Since the set output power PWs is switched to be equal to the actual output power PWa, the opening degree of the fuel control valve 14 is held at that time. Accordingly, since the opening degree of the fuel control valve 14 is not changed at time t2 and is held constant thereafter, "over-shooting" of the exhaust gas temperature EGT which occurs from time t2 can be greatly suppressed. FIG. 6 illustrates, for purposes of comparison with the control process of the present invention, a dotted line denoting an exhaust gas temperature involving significant over-shooting phenomenon, which may occur in the prior art.

By employing the second start-up control process of the present invention, the target temperature Ts of the exhaust gas can be set to a higher value Ts near the tolerance maximum temperature Tmax. By setting the target temperature Ts to be relatively high, the set output power PWs and thus the actual output power PWa can be raised.

Figure 7:
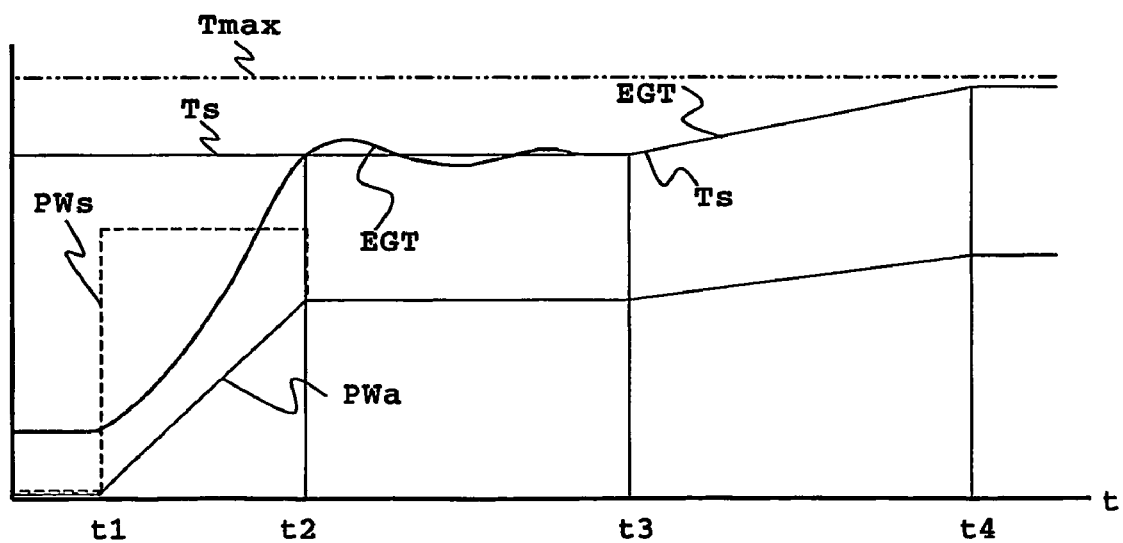
FIG. 7 is a semantic graph showing a relationship among set and actual output powers of the generator and an exhaust gas temperature, according to the present invention, in a case where the second start-up control process for the generator is executed and thereafter a set temperature value of an exhaust gas temperature is increased in the gas turbine apparatus shown in FIGS. 3A and 3B.

After the exhaust gas temperature EGT substantially converges with the target temperature Ts following either of the first or second generator start-up control process, a generator power up-shifting process is performed in the gas turbine apparatus 100. The power up-shifting process will next be explained with reference to FIGS. 7 and 8. FIG. 7 is the graph of FIG. 6 to which variations in the temperature EGT, the set output power PWs and the actual output power PWa from time t3 have been added. It is to be noted here that although the following description relates to a power shifting process following the second start-up control process as explained above with reference to FIG. 6, the power shifting process follows the first start-up control process, as explained above with reference to FIG. 4.

After performing the second start-up control process to converge the temperature EGT with the target temperature Ts during time period t1–t3, the output power up-shifting control process is performed from time t3.

Figure 8:
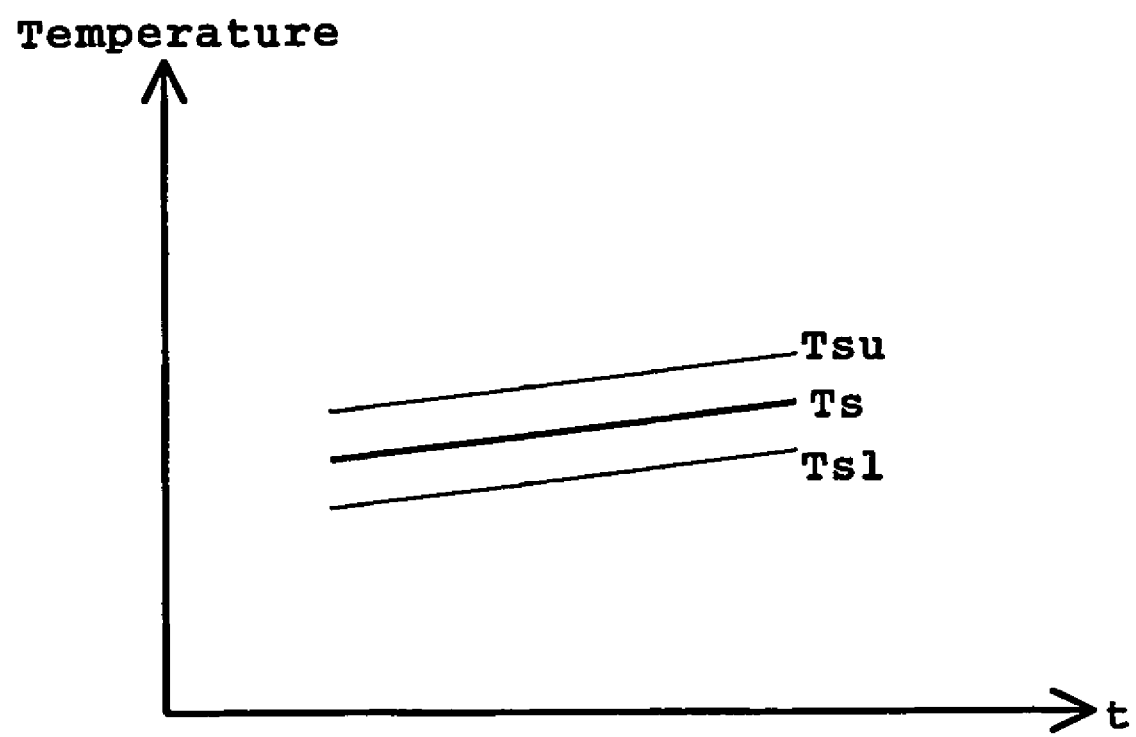
FIG. 8 is a graphical diagram for explaining a case that the set temperature value has upper and lower bands, after time t3 in FIG. 6.

In the output power shifting control process, the target set temperature Ts is gradually increased at the temperature setting unit 131, as shown in FIG. 7. The temperature setting unit 131 stores three substantially linear functions indicative of variations in the target temperature Ts, an upper set temperature Tsu higher than the temperature Ts and a lower set temperature Tsl smaller than the temperature Ts, as illustrated in FIG. 8. The upper and lower set temperatures Tsu and Tsl are referred to as reference temperatures for switching the set output power PWs down and up, respectively.

After time t3, the set temperatures Ts, Tsu and Tsl are gradually increased in the temperature setting unit 131, and thereby the actual temperature EGT falls below the lower set temperature Tsl. Such a condition is monitored and detected at the power setting unit 132, which upon detection, increases the set output power PWs to thereby cause the valve operating unit 133 to increase the opening degree of the fuel control valve 14. Accordingly, the actual output power PWa and the temperature EGT become higher. During the rise in the temperature EGT caused by increasing the set output power PWs, if the EGT reaches the upper set temperature Tsu, the set output power PWs is controlled to decrease it. In such a manner as described above, the actual output power PWa is gradually increased, following the increase in set temperature Ts. An increasing rate (or a gradient of the function of Ts in FIG. 8) is sufficiently shallow for the actual temperature EGT and actual output power PWa of the generator to substantially follow the increase without any substantial vibration being generated.

Finally, when the set temperature Ts reaches a certain temperature close to the tolerance maximum temperature Tmax, the set output power PWs is not increased and fixed at the temperature. Therefore, after time t4, the gas turbine apparatus 100 can operate in a condition that the temperature EGT is nearly equal to the tolerance maximum temperature Tmax, and thus can provide an actual output power substantially equal to a maximum available output power of the generator.

Although in the example described, the upper and lower set temperatures Tsu and Tsl, as well as the set centered temperature Ts, are employed in the power shifting control process, outer and inner upper set temperatures may be used instead of the single upper set temperature; and outer and inner lower set temperatures may be used instead of the lower set temperature. In such a case, as has been explained with reference to FIG. 4, increases and decreases in rates of the set output power PWs after the EGT reaches the outer lower and upper set temperatures, are greater than those after the EGT reaches the inner upper and lower set temperatures. By employing the four set temperatures, outer and inner, upper and lower set temperatures, the EGT can rapidly converge with the increasing set temperature Ts.

It is to be understood from the foregoing that a gas turbine apparatus according to the present invention is not limited to the examples described above, and may be modified in various ways without departing from the spirit of the invention.

The invention claimed is:

1. A gas turbine apparatus comprising:
   a turbine for providing rotational force;
   a combustor for burning a mixture of air and fuel and providing said turbine with a combustion gas to drive it;
   a generator connected to said turbine to receive the rotational force to generate electric power;
   a temperature sensor for measuring a temperature of an exhaust gas from said turbine;
   temperature setting means for setting a target temperature of said exhaust gas as a first set temperature, a second set temperature higher than said first set temperature, a third set temperature higher than said second temperature, and a fourth set temperature smaller than said first set temperature; and
   power setting means connected to said temperature sensor and temperature setting means, for setting a set output power of said generator as follows:
      a first set output power is set when starting-up said-generator;
      said first set output power of said generator is decreased at a first rate when said exhaust gas temperature measured by said temperature sensor reaches said second set temperature;
      a currently set output power of said generator is decreased at a second rate higher than said first rate when said exhaust gas temperature reaches said third set temperature after decreasing said set output power at said first rate; and
      a currently set output power of said generator is increased at a third rate smaller than said second rate when said exhaust gas temperature reaches said forth set temperature after decreasing said set output power at said second rate.

2. A gas turbine apparatus according to claim 1, wherein a difference between said first and second set temperatures is set to be substantially equal to a difference between said first and fourth set temperatures.

3. A gas turbine apparatus according to claim 1, wherein said first rate for use to decrease the set output power of said generator is set to be substantially equal to said third rate for use to increase the set output power of said generator.

4. A gas turbine apparatus according to claim 1, further comprising:
   means for setting an opening degree of a valve for providing said fuel to said combustor, in response to a set output power currently set in said power setting means.

5. A gas turbine apparatus according to claim 1, wherein said temperature setting means further comprises:
   set temperature increasing means for linearly increasing said exhaust gas set temperature from said first set temperature to a fifth set temperature near a tolerance maximum set temperature during a predetermined time period after said exhaust gas temperature measured by said temperature sensor converges on said first set temperature, and then keeping said set temperature at said fifth setting temperature.

6. A gas turbine apparatus according to claim 5, wherein said set temperature increasing means is adapted to set predetermined bands above and below a function defining the linear increase of said exhaust gas set temperature from said first set temperature to said fifth set temperature, and
said power setting means is adapted to decrease a currently set output power at a predetermined rate when said exhaust gas temperature is higher than the upper band, and to increase a currently set output power at a predetermined rate when said exhaust gas temperature is lower than the lower band.

7. A gas turbine apparatus comprising:
   a turbine for providing rotational force;
   a combustor for burning a mixture of air and fuel and providing said turbine with a combustion gas to drive it;
   a generator connected to said turbine to receive the rotational force to generate electric power;

a temperature sensor for measuring a temperature of an exhaust gas from said turbine;

temperature setting means for setting a target temperature of said exhaust gas as a first set temperature; and power setting means connected to said temperature sensor and temperature setting means, for setting a set output power of said generator such that a first set output power is set when starting-up said generator, and said first set output power of said generator is changed to a current process output power of said generator when said exhaust gas temperature measured by said temperature sensor reaches said first set temperature.

8. A gas turbine apparatus according to claim 7, further comprising:

means for setting an opening degree of a valve for providing said fuel to said combustor, in response to a set output power currently set in said power setting means.

9. A gas turbine apparatus according to claim 7, wherein said temperature setting means further comprises:

set temperature increasing means for linearly increasing said exhaust gas set temperature from said first set temperature to a second set temperature near a tolerance maximum set temperature during a predetermined time period after said exhaust gas temperature measured by said temperature sensor converges on said first set temperature, and then keeping said set temperature at said second set temperature.

10. A gas turbine apparatus according to claim 9, wherein said set temperature increasing means is adapted to set predetermined bands above and below a function defining the linear increase of said exhaust gas set temperature from said first set temperature to said fifth set temperature, and said power setting means is adapted to decrease a currently set output power at a predetermined rate when said exhaust gas temperature is higher than the upper band, and to increase a currently set output power at a predetermined rate when said exhaust gas temperature is lower than the lower band.

11. A method for starting-up a gas turbine apparatus which comprises a turbine for providing rotational force, a combustor for burning a mixture of air and fuel and providing said turbine with a combustion gas to drive it, and a generator connected to said turbine to receive the rotational force to generate electric power; said method comprising the steps of:

setting a set output power of said generator such that a first set output power is set when starting-up said generator;

setting a target temperature of said exhaust gas as a first set temperature, a second set temperature higher than said first set temperature, a third set temperature higher than said second temperature, and a fourth set temperature smaller than said first set temperature;

decreasing said first set output power of said generator at a first rate when said exhaust gas temperature measured by a temperature sensor reaches said second set temperature;

decreasing a current set output power of said generator at a second rate higher than said first rate when said exhaust gas temperature reaches said third set temperature after decreasing said set output power at said first rate; and increasing a current set output power of said generator at a third rate smaller than said second rate when said exhaust gas temperature reaches said forth set temperature after decreasing said set output power at said second rate.

12. A method for staring-up a gas turbine apparatus which comprises a turbine for providing rotational force, a combustor for burning a mixture of air and fuel and providing said turbine with a combustion gas to drive it, and a generator connected to said turbine to receive the rotational force to generate electric power, said method comprising the steps of;

setting a set output power of said generator such that a first set output power is set when starting-up said generator;

setting a target temperature of said exhaust gas as a first set temperature; and changing said first set output power of said generator to a current process output power when said exhaust gas temperature measured by said temperature sensor reaches said first set temperature.

* * * * *